(12) United States Patent
Sathiamoorthy et al.

(10) Patent No.: US 11,803,816 B2
(45) Date of Patent: Oct. 31, 2023

(54) WORKFLOW SERVICE EMAIL INTEGRATION

(71) Applicant: VMware, Inc., Palo Alto, CA (US)

(72) Inventors: Sudharsan Thumatti Sathiamoorthy, Bangalore (IN); Rohit Pradeep Shetty, Bangalore (IN); Shree Harsha S, Bangalore (IN); Ashish Agrawal, Bangalore (IN); Amit Jain, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/580,042

(22) Filed: Jan. 20, 2022

(65) Prior Publication Data

US 2022/0138696 A1    May 5, 2022

Related U.S. Application Data

(63) Continuation of application No. 16/551,762, filed on Aug. 27, 2019, now Pat. No. 11,257,042.

(30) Foreign Application Priority Data

Jul. 15, 2019    (IN) .............................. 201941028403

(51) Int. Cl.
| | | |
|---|---|---|
| G06Q 10/107 | (2023.01) | |
| G06F 8/60 | (2018.01) | |
| G06Q 10/101 | (2023.01) | |
| H04L 51/046 | (2022.01) | |
| H04L 51/18 | (2022.01) | |
| H04L 51/216 | (2022.01) | |

(52) U.S. Cl.
CPC ............. *G06Q 10/107* (2013.01); *G06F 8/60* (2013.01); *G06Q 10/101* (2013.01); *H04L 51/046* (2013.01)

(58) Field of Classification Search
CPC ...... G06Q 10/107; G06Q 10/101; G06F 8/60; H04L 51/046; H04L 51/18; H04L 51/216
See application file for complete search history.

(56) References Cited

U.S. PATENT DOCUMENTS

| | | | | |
|---|---|---|---|---|
| 7,130,885 B2* | 10/2006 | Chandra | .............. | G06Q 10/107 709/224 |
| 8,204,949 B1* | 6/2012 | Krajec | ............. | G06Q 10/06311 715/209 |
| 9,262,035 B1* | 2/2016 | Gustafson | ............... | G06F 9/451 |
| 11,210,412 B1* | 12/2021 | Ghetti | ................... | H04L 63/083 |

(Continued)

*Primary Examiner* — John A Follansbee
*Assistant Examiner* — Kamal M Hossain
(74) *Attorney, Agent, or Firm* — Thomas Horstemeyer, LLP

(57) ABSTRACT

Disclosed are various approaches for workflow service email integration. In some examples, an email application executed on a client device receives an email message that includes a workflow micro application. The workflow micro application has a workflow information component, and evaluation component, and a workflow actions component. The evaluation component identifies a presence or an absence of a management software development kit (SDK) on the client device. The email application renders a user interface that shows or hides a workflow actions interface area based on the presence or absence of the management SDK.

20 Claims, 7 Drawing Sheets

(56) References Cited

U.S. PATENT DOCUMENTS

| | | | |
|---|---|---|---|
| 2005/0091600 A1* | 4/2005 | Yamamoto | H04L 63/083 |
| | | | 715/752 |
| 2011/0119102 A1* | 5/2011 | Horn | G06Q 10/06 |
| | | | 709/206 |
| 2015/0180809 A1* | 6/2015 | Doulton | G10L 15/26 |
| | | | 709/206 |
| 2016/0012074 A1* | 1/2016 | Fermum | G06F 16/248 |
| | | | 707/783 |
| 2018/0054408 A1* | 2/2018 | Morris | G06F 16/955 |
| 2018/0069811 A1* | 3/2018 | Libin | H04L 51/10 |
| 2019/0182191 A1* | 6/2019 | Bastide | H04L 51/10 |
| 2019/0279157 A1* | 9/2019 | Eapen | H04L 63/0807 |
| 2019/0384632 A1* | 12/2019 | Parikh | G06F 21/552 |

\* cited by examiner

WORKFLOW SERVICE EMAIL INTEGRATION

CROSS-REFERENCE TO RELATED APPLICATIONS

This Application claims benefit of and priority to the following related applications as a continuation of U.S. application Ser. No. 16/551,762, filed on Aug. 27, 2019 and entitled "WORKFLOW SERVICE EMAIL INTEGRATION," which claims benefit under 35 U.S.C. 119(a)-(d) to Foreign Application Serial No. 201941028403 filed in India entitled "WORKFLOW SERVICE EMAIL INTEGRATION," on Jul. 15, 2019, by VMWare, Inc., all of which are hereby incorporated herein by reference in their entireties.

BACKGROUND

In an enterprise setting, individuals can utilize a number of different services and applications in order to complete tasks. Users can use authentication credentials to login to various applications or various services. Often times, these authentication credentials differ from service to service even though they correspond to the same individual or group. Different services and authentication types can impede workflows performed by individuals, as the authentication process can be cumbersome. For example, individuals may struggle to recall the service that should be used for a particular task or the credentials for the service.

Users may not be apprised of the specifics of a workflow task until they log in to the service. As a result, users can forget the specifics of workflow tasks when composing emails. Because retrieving the workflow information can be a cumbersome task, emails can include inaccurate and outdated information, or the relevant information can be excluded entirely. While these issues are present for any device, authentication can pose problems for enterprise productivity when using smaller devices with limited display area, such as mobile devices. Accordingly, traditional methods can be ineffective to integrate workflows into emails in an enterprise setting.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to workflow service back end integration. For example, a workflow service can manage enterprise workflows using network services and other enterprise back ends. This can include authentication with the network services and performing workflow actions. Multiple services and authentication types can be utilized by enterprise users. Users may struggle to recall the service that should be used for a particular task, or the credentials for the service. Users may not be apprised of tasks associated with a particular service until they log in to the service. Some devices may not be designed for the authentication type utilized by a particular service. Accordingly, traditional methods can be ineffective for accessing network services in an enterprise setting. However, the present disclosure describes a more effective solution to authenticate with network services for enterprise workflows.

Figure 1:
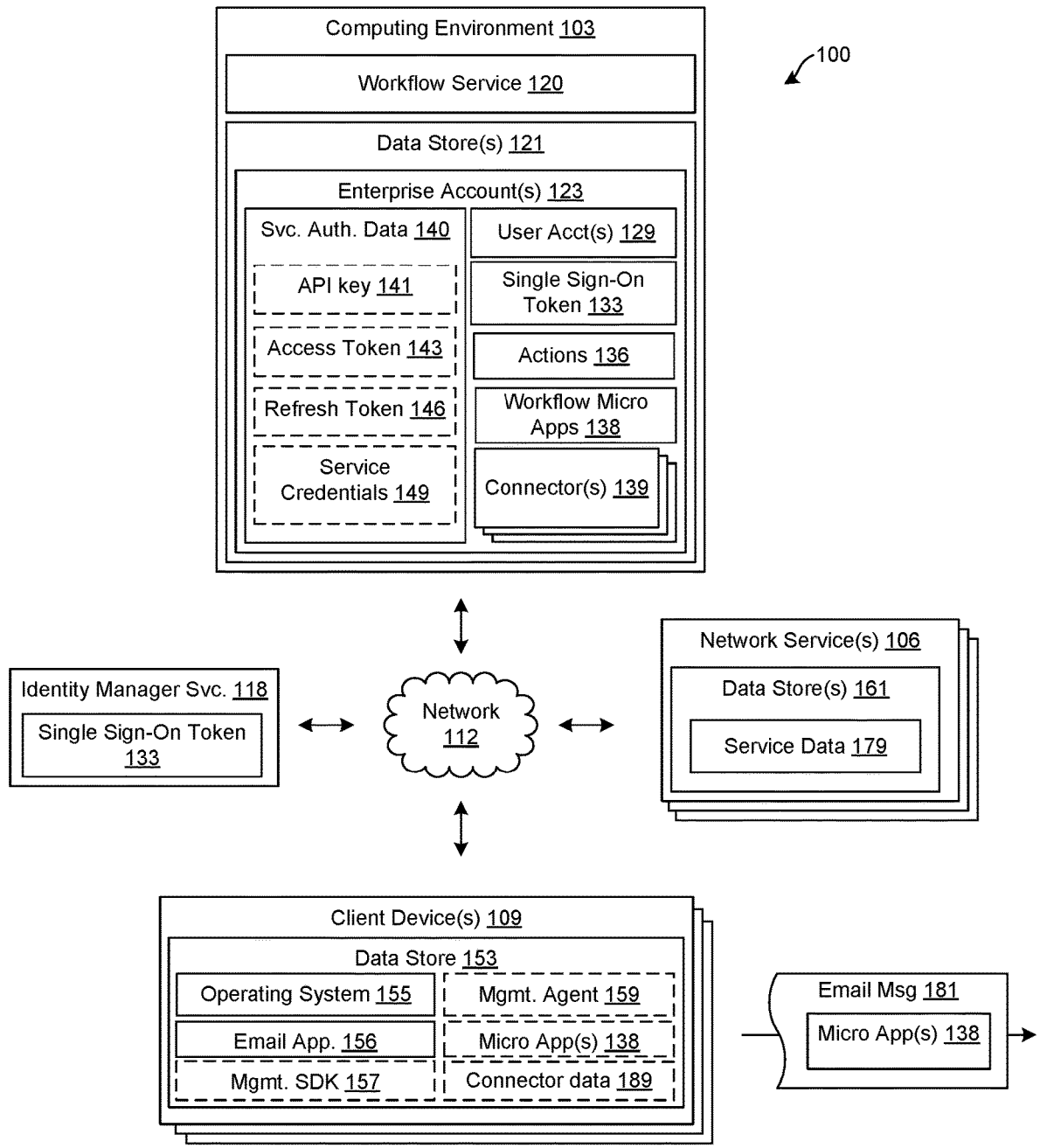
FIG. 1 is a drawing of an example of a networked environment, including client devices, network services, an identity manager service, a workflow service, and other components in communication through a network.

With reference to FIG. 1, shown is an example of a networked environment 100. The networked environment 100 can include a computing environment 103 executing a workflow service 120, identity manager service 118, network services 106, and client devices 109 in communication through a network 112.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 executing the workflow service 120 can include a server computer or any other system providing computing capability. While referred to in the singular, the computing environment 103 can include a plurality of computing devices that are arranged in one or more server banks, computer banks, or other arrangements. The computing devices of the computing environment 103 can be located in a single installation or can be distributed among many different geographical locations local and/or remote from the other components. The computing environment 103 can include a grid computing resource or any other distributed computing arrangement. The computing environment 103 can also include or be operated as one or more virtualized computer instances. For purposes of convenience, the computing environment 103 is referred to herein in the singular. The components executed on the computing environment 103 can include a workflow service 120 as well as other applications, services, processes, systems, engines, or functionality not discussed in detail herein. The workflow service 120 can be stored in the data store 121 of the computing environment 103.

The workflow service 120 can be utilized by one or more enterprises. In some embodiments, the workflow service can be part of a local network, trusted network, or intranet, which can be separate from the other components of the networked environment 103. In some cases, the identity manager service 118 can be part of the computing environment 103. In other cases, the identity manager service 118 can be separate from the computing environment 103.

The workflow service 120 can manage enterprise workflows performed by users of the client devices 109. The workflow service 120 can also manage authentication with network services 106 that are utilized as backend services for the workflows. The workflow service 120 can monitor one or more network services 106 that a user is authorized to access. For example, the workflow service 120 can periodically query a network service 106 for notifications, updates, messages, changes, actions to be performed, or other events. If a notification, update, message, change, action to be performed, or other event is identified, the workflow service 120 can then notify the user. For example, the workflow service 120 can send a message to the client device 109 to notify the user. The operating system 155 of the client device 109 can include a notification framework that provides a notification for the message using the client device 109. The notification can include a sound generated using an audio device, a visual notification using a display device, and haptic feedback using a haptic device.

The workflow service 120 can include authentication functionality, which can include retrieving, caching or storing service authentication data 140 provided by various network services 106. The authentication data 140 can be used to query the network services 106 for information. In some embodiments, use of the workflow service 120 can be invisible to the user. In other embodiments, the user may be asked to opt-in to the use of authentication services of the workflow service 120 or the identity manager 118 through a web-portal or other user interface. Such a web-portal or other user interface can be provided, for example, by the workflow service 120 or the identity manager 118.

The data store 121 can include any storage device or medium that can contain, store, or maintain the instructions, logic, or applications described herein for use by or in connection with the computing environment 103. The data store 121 can be a hard drive or disk of a host, server computer, or any other system providing storage capability. While referred to in the singular, the data store 121 can include a plurality of storage devices that are arranged in one or more hosts, server banks, computer banks, or other arrangements. The data store 121 can include any one of many physical media, such as magnetic, optical, or semiconductor media. More specific examples include solid-state drives or flash memory.

The data store 121 can include memory of the computing environment 103, mass storage resources of the computing environment 103, or any other storage resources on which data can be stored by the computing environment 103. The data stored in the data store 121 can include, for example, a number of enterprise accounts 123, each of which can be associated with user accounts 129, service authentication data 140, single sign-on tokens 133, actions 136, workflow micro applications 138, and local connectors 139.

The user accounts 129 can be associated with specific subsets of the service authentication data 140, single sign-on tokens 133, actions 136, workflow micro applications 138, and connectors 139. While shown within the computing environment 103, connectors 139 can include local and external connectors. External connectors 139 can be hosted in a cloud or another network resource. The data stored in the data store 121 can be associated with the operation of the various applications and/or functional entities described. A user account 129 includes information associated with a user. The information can include one or more authentication credentials, such as the single sign-on tokens 133, as well as stored or cached access tokens 143, refresh tokens 146, and service credentials 149. Other information about the user can also be stored as part of the user account 129, such as the user's name, email address, contact information, enterprise responsibilities, and client devices 109. The responsibilities can include responsibilities to perform particular actions 136 or types of actions 136 for the enterprise.

A user account 129 can also include access permissions that indicate computing resources that the user account is authorized to access. For example, the access permissions can indicate that a user account is permitted to access some network services 106 but is prohibited from accessing other network services 106. As another example, the access permissions can indicate that the user account 129 is allowed to access certain features of a network service 106, but prohibited from accessing other features. For example, if one of the network services 106 that a user was permitted to access was a customer relationship management (CRM) service, the user might have permission to access his or her own contacts but be prohibited from accessing the sales contacts of other users.

The user account 129 can identify device data for associated client devices 109. Device data can include one or more of a device identifier, a unique device identifier (UDID), a media access control (MAC) address, an internet protocol (IP) address, or another identifier that uniquely identifies a device with respect to other devices. The device data can include device specifications, and a type of each client device 109. Specifications for the client device 109 can include a hardware configuration that specifies a chipset identifier, a video card identifier, a memory identifier, a monitor or screen identifier, an input device identifier, and a peripheral identifier for each peripheral utilized by the client device 109. Specifications for the client device 109 can include a software configuration that specifies an application identifier for each application installed on the client device 109, a driver or driver version for hardware device and peripheral of the client device 109, an operating system or operating system version installed on the client device 109, and other information. The user account 129 can also include an organizational group of the user account 129 or the client device 109.

The single sign-on (SSO) token 133 is a software token generated by the identity manager 118 in response to a successful authentication of the user with the identity manager 118 using authentication credentials for the identity manager. The identity manager credentials can be user- or account-specific. The identity manager credentials can represent the credentials that a user can present to the identity manager 118 to authenticate the user's identity. Identity manager credentials can include a combination of a username and password, a cryptographic certificate, a one-time password, or a combination of several of credentials as part of a multi-factor authentication schema. Examples of one-time passwords can include a one-time password generated using a version of the time-based one-time password algorithm (TOTP) or a one-time password generated using the HMAC-based one-time password (HOTP) algorithm.

The SSO token 133 can be used to provide the client device 109 access to various network services 106 on behalf of the authenticated user. The SSO token 133 can include a character string or other data. In some cases, the SSO token 133 can be provided in a request, a command, a response, a URL, a file, or another structure, and can be in XML format, JSON format, or another format. In some instances, such as those implementing a version of the KERBEROS protocol, a separate SSO token 133 can be generated for each network service 106 that the client device 109 attempts to access on behalf of the user. In other instances, the single SSO token 133 can be generated and used to provide the client device 109 with access to several of the network services 106. Although each of the network services 106 can have a different set of authentication credentials linked to the user account 129, such as a different user name and password combination, the SSO token 133 allows the user to authenticate once with the identity manager 118 in order to use each of the network services 106 instead of having to authenticate with each of the network services 106 separately.

The identity manager 118 can authenticate users and manage user authorizations or permissions to access network services 106, applications, data, or other computing resources. For example, the identity manager 118 could correspond to a single sign-on portal that verifies a user's authentication credentials 133, issues a single sign-on token 133 that identifies the user, and verifies whether the user has the appropriate access permissions to access one or more network services 106. Examples of identity managers 118 include AMAZON's AWS Identity and Access Management (IAM) service, VMWARE's Identity Manager, or MICROSOFT's Active Directory Federation Services.

A network service 106 can be web application, web service, or other network facing application. The network service 106 can be federated or associated with a shared identity manager 118 so each can be accessed using the identity manager 118. One or more network services 106 can be provided by the same provider or by different providers. The network service 106 can receive a service request, and provide a service data 179 based on the service request. The workflow service 120 can generate the service request, or receive the service request from a client device 109. The workflow service 120 can use a connector 139 to provide the service request to the network service 106. The network service 106 can provide service data 179 in response to the service request. The network service 106 can transmit the service data 179 directly to the client device 109, or the service data 179 can be relayed to the client device 109 through the workflow service 120.

The service authentication data 140 can include information that guides authentication with network services 106. For example, API keys 141, access tokens 143, refresh tokens 146, service credentials 149, cryptographic certificates and other credentials. The service authentication data 140 can also include network endpoints or addresses associated with particular functionalities provided by a network service 106. Service authentication data 140 can also include a process or a number of navigation actions or other actions that is required for the workflow service 120 to perform authentication with a network service 106 on behalf of a user.

The API key 141 can be a token provided by one of the network services 106 in response to a successful authentication with the network service 106. The API key 141 represents that a user account 129 is currently authorized to access or otherwise interact with the network service 106. The API key 141 can include a character string, code, or other data. The API key 141 can be provided to a network service 106 for authentication. For example, the API key 141 can be provided in an HTTP header, a URL query string parameter, a request body field, or another structure.

The access token 143 can be a token provided by one of the network services 106 in response to a successful authentication with the network service 106. The access token 143 represents that a user account 129 is currently authorized to access or otherwise interact with the network service 106. The access token 143 can include a character string, code, or other data. The access token 143 can be provided to a network service 106 for authentication. The access token 143 can be provided to a network service 106 for authentication. For example, the access token 143 can be provided in an HTTP header, a URL query string parameter, a request body field, or another structure. For security purposes, the access token 143 can have a time-limit associated with it, such as 1 hour, 3 hours, 6 hours, 8 hours, or some other period of time. Once the time-limit has expired, the access token 143 can no longer be used to prove current authentication status of the user account 129 with the network service 106. The access token 143 can be provided, for example, as part of an authentication exchange using a version of Open Authorization (OAUTH) protocol.

The refresh token 146 can be a token provided by one of the network services 106 in response to a successful authentication with the network service 106. The refresh token 146 can be used to acquire a new access token 143 once a current or previous access token 143 expires. The refresh token 146 often has a much longer time-limit associated with it, such as 1 day, 1 week, 30 days, 3 months, or 1 year, which allows for the refresh token 146 to be used to acquire a series of access tokens 143 after an initial successful authentication. In the event that a user's access is revoked, the refresh token 146 can be marked invalid, preventing the refresh token 146 from being used to acquire new access tokens 143. The refresh token 146 can be provided, for example, as part of an authentication exchange using a version of the OAUTH protocol.

The workflow service 120 can submit an authentication request to the network service 106. Once authenticated, the network service 106 can provide credentials and other authentication data 140 to the workflow service 120. The workflow service 120 can store or cache the authentication data 140 to use on behalf of a user. If the authentication data 140 expires, or the workflow service 120 determines that an authentication using the authentication data 140 is unsuccessful, the workflow service 120 can attempt to obtain new credentials or new authentication data 140. For example, the workflow service 120 can automatically obtain a new access token 143 for the user when the current access token 143 expires or is about to expire. For example, the workflow service 120 can determine that the access token 143 was obtained 59 minutes ago, but is only valid for one hour. As another example, the workflow service 120 can determine that the access token 143 was obtained 61 minutes ago, but the access token 143 was only valid for one hour. In response to either example, workflow service 120 can submit a second authentication request to the network service 106. The second authentication request can include the refresh token 146.

The service credentials 149 can include a password, a token, a certificate, or another form of credentials. The service credentials 149 can be generated according to a security standard. The service credentials can be associated with a particular network service 106, or a particular function provided by the network service 106. Service credentials 149 can be considered a multi-user password, as multiple users or user accounts 129 can utilize the same service credentials 149 to access the network service 106. The service credentials 149 can also be group-wide credentials for use by a group of users, or enterprise-wide credentials for use by an entire enterprise. Group credentials, enterprise-wide credentials, or other multi-user credentials can also include a username and password, a cryptographic certificate, a character string, a one-time password, or a combination of several of credentials as part of a multi-factor authentication scheme.

The actions 136 can include workflow tasks or workflow actions that are part of an enterprise workflow. For example, actions 136 can include scheduling a meeting, sending a product order, sending a message, adding a calendar item, requesting an application, requesting a client device 109, and other workflow actions. Actions 136 can specify user account permissions, or a list of user account(s) 129 that are authorized to perform the particular action 136. In addition, enterprise accounts 123 can include a list of actions 136 that the enterprise has permissions or authorization to perform. Other actions 136 can be performed by any user account 129. The actions 136 can also include a trigger condition that the workflow service 120 can identify in order to determine the actions 136 should be performed.

Workflow micro applications 138 can refer to components that can be rendered in a user interface of an email application 156 to facilitate workflow service email integration. The workflow micro applications 138 can be rendered for display while composing an email using the email application 156, and also rendered for display when an email is received. Workflow micro applications 138 can provide service data 179 within a card or other user interface area in the email application 156. In addition, workflow micro applications 138 can include executable code that determines whether to provide, or decline to provide, workflow action elements that when selected, initiate or cause workflow actions 136 to be performed at the network service 106.

For example, a workflow micro application 138 can include executable code that identifies whether a management software development kit (SDK) 157 is present or installed on the client device 109. The management SDK 157 can be included in a management agent 159, or installed to the client device 109 using the management agent 159. The management SDK 157, or the management agent 159, can be configured to communicate and authenticate with the workflow service 120. If the management SDK 157 is present, then the workflow micro application 138 can show user interface elements that when selected transmit a request to perform the action. The presence of the management SDK 157 allows the workflow micro application 138 to identify permissions of the client device 109 or an enterprise account 123 associated with the client device 109. Account-specific actions 136 can be received from the workflow service, and the workflow micro application 138 can render action elements, or user interface elements that initiate the actions. If the management SDK 157 is not present, the workflow micro application 138 can hide the action elements or decline to provide the action elements. However, even if the management SDK 157 is absent, the workflow micro application 138 can still render service data 179 in the user interface of the email application.

Workflow micro applications 138 can be generated by the workflow service 120 or the management agent 159 while a user is composing an email using the email application 156. In some examples, the email application 156 can partner with the workflow service 120, and the email application 156 can interact with the management SDK 157 or management agent 159. The management agent 159 can identify workflow content in an email message 181 being composed. In some cases, the client device 109 can store connector data 189 associated with the connectors 139, and the management agent 159 can compare the connectors 139 to the email message 181 based on the connector data 189 to identify workflow content. The client device 109 can also transmit textual content of the email message 181 to the workflow service 120, and the workflow service 120 can compare the email message 181 to the connectors 139 to identify workflow content in the email message 181. If textual data in the email matches textual connector data 189 for one more of the connectors 139, then the management agent 159 can transmit a request for workflow micro applications 138 to the workflow service 120. For example, a user's name, a customer name, an enterprise name, a user identifier, a ticket number, or any information associated with a connector 139 can be identified as workflow content in an email message 181.

In some cases, the workflow content can be identified using an alphanumeric format associated with a connector 139. The connector data 189 can include, for each connector 139 of the workflow service 120, one or more alphanumeric format. The alphanumeric formats can refer to a format of a ticket identifier, matter identifier, event identifier, or other identifiers for the network service 106 or connector 139. For example, a ticket identifier for a particular network service 106 can include three letters followed by a space or dash, and four numbers. A management agent 159 can identify that workflow content by identifying a pattern specified by the alphanumeric format. The management agent 159 can then transmit a request for network service data 179, or a request for workflow micro applications 138. The request can include the workflow content that matches the alphanumeric format of the connector 139.

The workflow service 120 can retrieve network service data 179 from a network service 106 and generate a workflow micro application 138 that includes the network service data 179. Since the service data 179 is included in the workflow micro application 138 once generated, the workflow micro application 138 can show this information whether or not the management SDK 157 or management application 159 is present on the client device 109. As a result, workflow micro applications 138 enable a workflow service to provide useful and relevant information for enterprise workflows on any client device 109. While any client device 109 and any email application 156 can render the workflow micro application 138 once generated. However, as indicated above, the workflow micro application 138 can determine whether to provide or hide user interface elements that transmit action requests for actions 136 to be performed using the network services 106. The email application 156 can transmit the email message 181, which can include workflow micro applications 138. Another client device 109 can receive the email message 181 and view the workflow micro applications 138.

Connectors 139 can refer to services or components of the workflow service 120 that can fetch information that enables a user to perform an action at a network service 106, while using a client device 109. As a result, a connector 139 can be referred to as a network service connector of the workflow service 120. In some cases the connectors can be provided using a virtual machine or another virtual resource. Connectors 139 can include local connectors 139 hosted in the computing environment 103, or external connectors 139 hosted external to the computing environment 103. Connectors 139 can handle communications with the network services 106, which in some examples can be provided by third-parties relative to the provider of the e-mail application 156. For example, a connector 139 can fetch account-specific and action-specific information from network services 106. Connectors 139 can be used to perform a particular action 136 using a network service 106. Connectors 139 can indicate a particular network service 106 that can be used to perform the action 136. An enterprise can have access to a number of network services 106 that can handle a particular action 136. The workflow service 120 can provide a user interface through which an enterprise can generate a connector 139 that associates a particular action 136 with a particular network service 106.

The workflow service 120 can transmit service requests, or requests associated with network services 106, to the connectors 139. In some cases, a connector 139 is hosted in the computing environment 103, and the workflow service 120 can provide the local connector 139 with a service request that includes service credentials 149. However, when a connector 139 is external to the computing environment 103, the workflow service 120 can transmit a service request that does not include the service credentials 149. The service request can include instructions to obtain service credentials 149 from an enterprise-hosted data store external to the computing environment 103. The connector 139 can retrieve the service credentials 149, and fetch information from the network service 106.

The workflow service 120 can include an administrative console or user interface that enables a user to configure a connector to fetch data from a network service 106. The user interface can include a text box or other user interface elements through which connector specifications can be entered or otherwise configured. The connector 139 can include a connector name, a public facing connector URL or connector network address, a network endpoint of the network service 106, and an authentication type for the network service 106. The authentication types can include username/password, OAUTH, SSO, and others. The workflow service 120 can determine whether a particular connector is a local connector 139 or an external connector 139 by analyzing the connector URL. For example, the connector address can indicate that the connector is a local connector 139 where the connector URL includes a reference to a localhost, or the connector address is identified as a local IP address. The connector address can indicate that the connector is an external connector 139 where the connector address is a remote IP address, the connector URL excludes reference to a localhost.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, a voice activated smart device, or any other device with like capability. The client device 109 can have an operating system that can perform functionalities and execute applications. The operating system 155 can be stored in a data store 145 that also includes a client management agent 159, other applications, and other data. The client device 109 can execute the client management agent 159 to perform or access the functionality described for the workflow service 120. The client device 109 can be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine, a voice activated smart device, or a kiosk that is located in a particular location, or is not easily portable. The client device 109 can include user interface devices that can be utilized to interact with users. The user interface devices can include audio devices, display devices, and haptic devices.

The operating system 155 of the client device 109 can execute various client functionalities or client applications, such as a management agent 159, a browser application, a voice interaction functionality, or another application. The operating system 155 and some applications can access network content served up by the computing environment 103, or other servers and can present this information to a user through one or more of the user interface devices. For example, the client device 109 can render a user interface on a display, such as a liquid crystal display (LCD), organic light emitting diode (OLED) display, touch-screen display, or other type of display device. The client device 109 can also present audio information using the audio device, and can provide haptic or physical feedback using the haptic device.

Client applications can include a browser or a dedicated application, and a user interface can include a network page, an application screen, or other interface. The client device 109 can also access web applications using the browser application. Further, other applications can include enterprise applications, social networking applications, word processors, spreadsheet applications, media player applications, or other applications. The management agent 159 can be an application that performs certain functions in concert with the workflow service 120. The client management agent 159 can perform actions as directed by the workflow service 120, for instance, by checking in with the workflow service 120, retrieving a command from the command queue, and implementing the command as discussed above.

Figure 2:
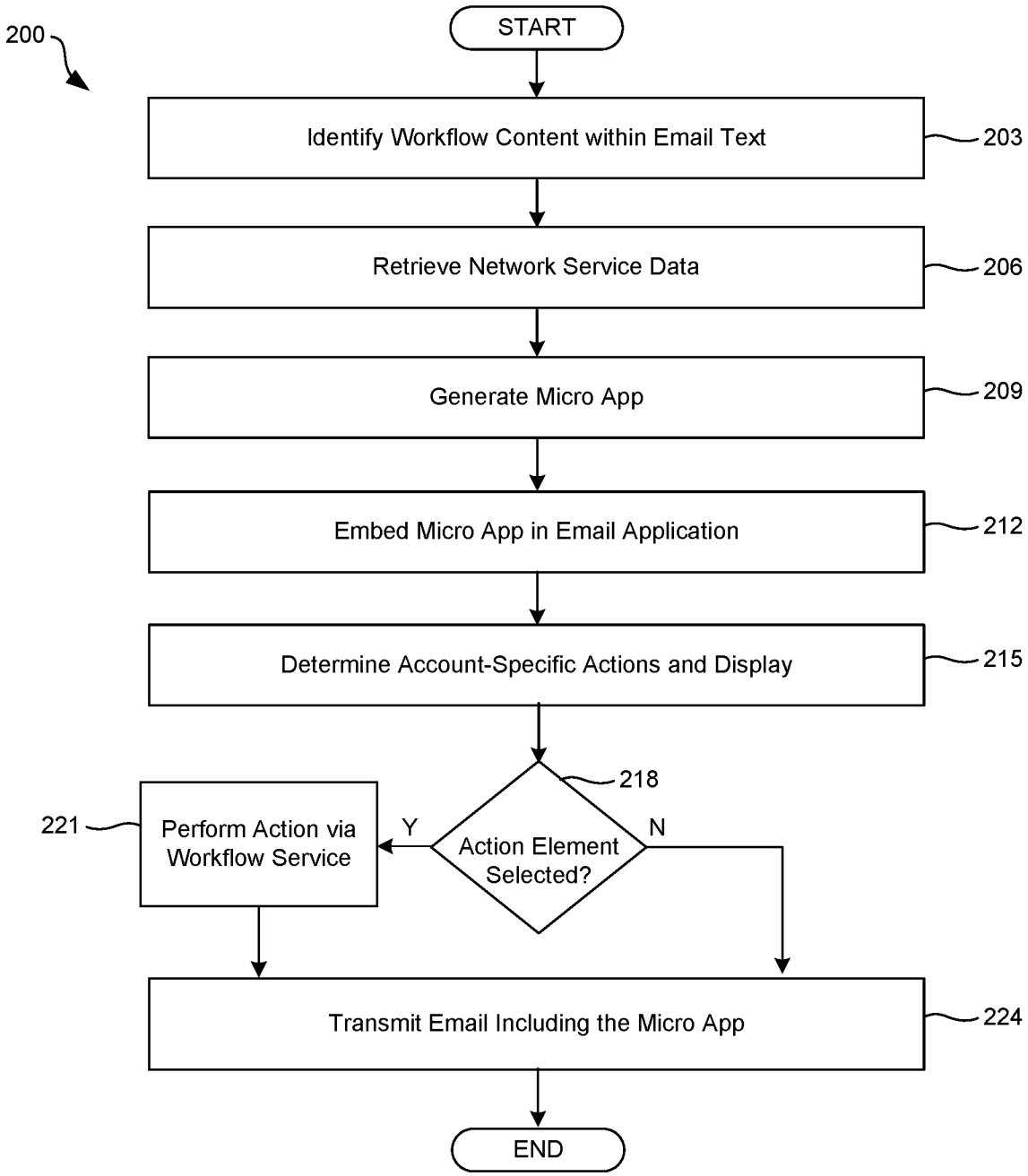
FIG. 2 is a flowchart outlining functionalities implemented by the workflow service and other components of the networked environment.

FIG. 2 shows an example flowchart 200 describing steps that can be performed by the components of the networked environment 100 of FIG. 1, as an email message 181 is being composed. Generally, the flowchart 200 describes how the components of the networked environment 100 identify workflow content within an email message 181 and embed workflow micro applications 138 within the email message 181. The email message 181 can be composed in an email composition user interface of an email application 156.

In step 203, the management agent 159 can identify workflow content within an email message 181. The email message 181 can be composed using an email application 156 of the client device 109. In some cases, the email application 156 can identify the workflow content within the email message 181. Otherwise, the management agent 159 can be interfaced with the email application 156 as the email message 181 is being composed. The management agent 159 can compare the textual content of the email message 181 with textual content of the connectors 139 or connector data 189. The management agent can access the textual data of the connectors 139 or connector data 189 locally to the client device 109, or through the workflow service 120.

In step 206, the management agent 159 can retrieve network service data 179 associated with the workflow content identified in the email message. The management agent 159 can identify a particular connector 139 that includes the workflow content or textual data of the email message 181. The management agent 159 can then transmit a network service request to the network service 106 using the particular connector 139 of the workflow service 120. The network service 106 can return the network service data 179 in response to the network service request. In some cases, the network service 106 can return the network service data 179 can return the network service data 179 directly to the client device 109, and in other cases the network service data 179 can be relayed through the workflow service 120.

In step 209, the management agent 159 can generate the workflow micro application 138. The workflow micro application 138 can include the network service data 179 as well as the ability to display account-specific actions. For example, the workflow micro application 138 can have a number of software or executable instruction components. The workflow micro application 138 can include a workflow information component, an evaluation component, a workflow actions component, and other components. The workflow information component can include a JavaScript or other structure that can be accessed in the email application 156 to render the workflow-relevant network service data 179 for display within the email message 181. The evaluation component can evaluate a management status of the client device 109. For example, the evaluation component can determine the management status of the client device 109 based on a presence or absence of a management SDK 157 or management agent 159. The management agent 159 can include the management SDK 157. If the management SDK 157 is present on the client device 109, the evaluation component can enable or activate the workflow actions component of the workflow micro application 138. However, if the management SDK 157 is absent from the client device 109, the evaluation component can disable or deactivate the workflow actions component of the workflow micro application 138. Deactivation of the workflow actions component can hide a workflow actions area that includes the action elements. The workflow actions component can include workflow action elements, or user interface elements that request actions 136 to be performed on the network service 106. The actions 136 can be account-specific workflow actions 136 associated with the workflow content in the email message 181.

The workflow actions component of the workflow micro application 138 can identify user- or account-specific actions 136 to include based on an enterprise account 123 associated with the client device 109. The workflow micro application 138 can utilize the management SDK 157 or management agent 159 to transmit and receive communications between the client device 109 and the workflow service 120. The management SDK 157 or management application 159 can have access to an SSO token 133, and the SSO token 133 can be include in communications transmitted to the workflow service 120. The workflow micro application 138 can, through the workflow service 120, receive or otherwise identify the account-specific actions 136 to include in the workflow micro application 138. The account-specific actions 136 can refer to actions 136 that are authorized or permitted for the enterprise account 123 associated with the client device 109 or a user of the client device 109.

In some cases, the management agent 159, facilitates the workflow service 120 to identify workflow content in the email message 181, retrieve the network service data 179, generate the workflow micro application 138, and transmit the workflow micro application 138 to the client device 109. For example, the management agent 159 can obtain the SSO token 133 from the identity manager service 118 by logging in using user credentials. The management agent 159 can authenticate with the workflow service 120 using an SSO token 133. The management agent 159 can provide the textual content of the email message 181 to the workflow service 120. The workflow service 120 can compare the textual content of the email message 181 with textual content of the connectors 139. The workflow service 120 can identify a particular connector 139 that includes the workflow content or textual data of the email message 181. The workflow service 120 can transmit a network service request to the network service 106 using the particular connector 139 of the workflow service 120. The network service 106 can return the network service data 179 to the workflow service 120 in response to the network service request. The workflow service 120 can generate a workflow micro application 138 that includes the network service data 179 as well as the ability to display account-specific actions.

In step 212, the management agent 159 or the email application 156 can embed the workflow micro application 138 in the email message 181 as it is being composed. As a result, the workflow micro application 138 can provide the composer of the email message 181 with relevant and specific network service data 179.

In step 215, the workflow micro application 138 can determine account-specific actions 136 and display them in the email message 181 that is being composed. While the evaluation component of the workflow micro application 138 can determine whether the management SDK 157 is present before determining account-specific actions 136, it is understood that the composer of the email that initially includes the workflow micro application 138 will have the management SDK 157. As a result, the workflow actions component can be enabled by the workflow micro application 138. The workflow actions component of the workflow micro application 138 can identify user- or account-specific actions 136 to include based on an enterprise account 123 associated with the client device 109. The workflow micro application 138 can utilize the management SDK 157 or management agent 159 to authenticate communications between the client device 109 and the workflow service 120. The workflow micro application 138 can, using the management SDK 157, transmit a request for permitted actions to the workflow service 120. The workflow service 120 can return the permitted actions to the workflow micro application 138. The workflow micro application 138 can render action elements for permitted actions in the email message 181 as it is being composed in an email composition user interface of the email application 156.

In step 218, the workflow micro application 138 can identify whether an action element rendered for display in the email message 181 is user-selected. If the workflow micro application 138 identifies a user selection of an action element, the process can proceed to step 221. Otherwise, the process can proceed to step 224.

In step 221, the workflow micro application 138 can transmit a request for the action to be performed on the network service 106. The workflow micro application 138 can transmit the action request to the workflow service 120 along with an SSO token 133. The workflow micro application 138 can utilize the management SDK 157 to transmit the action request. For example, the management SDK 157 can include an appropriate workflow service endpoint, such as an actions implementation endpoint, or a connector endpoint for the workflow service 120. Accordingly, the micro application 138 can use the connector 139 of the workflow service 120 to request that the action 136 be taken at the network service 106. The workflow service 120 can perform authentication with the network service 106 using service authentication data 140 to facilitate the request for the action to be performed using the network service 106. This process can enable authentication processes that can be difficult or impossible on certain client devices 109.

In step 224, the client device 109 can transmit the email that includes the workflow micro application 138. As discussed above, the network service data 179 is included within the workflow micro application 138. As a result, this network service data 179 is accessible to be rendered in the email message 181 even where the management SDK 157 is absent from a recipient device, or client device 109 that is used to access the email message 181 once received. In addition, if the management SDK 157 is present on a device accessing the email message 181, the workflow micro application 138 can enable the workflow actions component to show user-specific actions 136.

Figure 3:
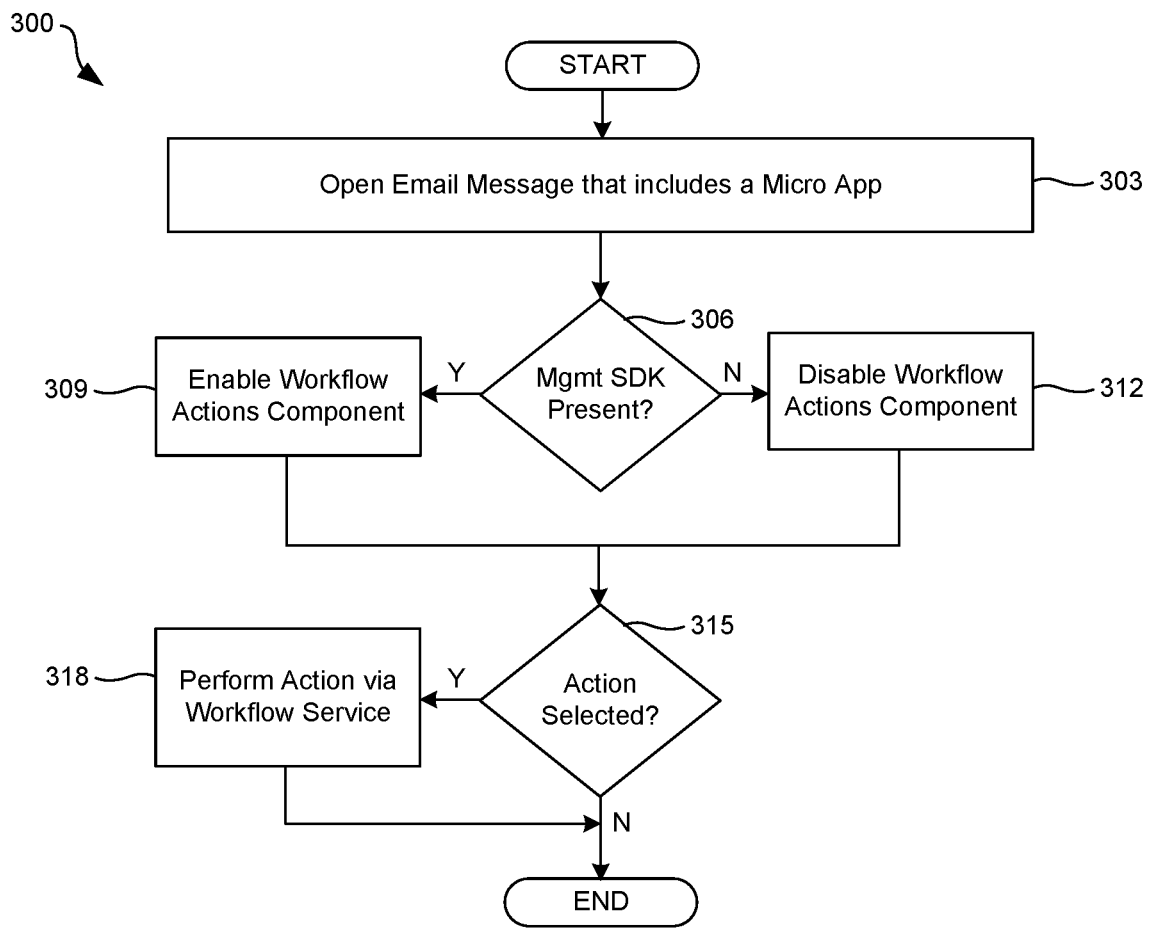
FIG. 3 is a flowchart outlining functionalities implemented by the workflow service and other components of the networked environment.

FIG. 3 shows an example flowchart 300 describing steps that can be performed by the components of the networked environment 100. Generally, the flowchart 300 describes how the components of the networked environment 100 render a workflow micro application 138 within a received email message 181.

In step 303, the client device 109 can open an email message 181 that includes a workflow micro application 138. The workflow micro application 138 can execute when a received email message 181 is opened or rendered for display in an email reader user interface of an email application 156.

In step 306, the workflow micro application 138 can determine whether the management SDK 157 or management agent 159 is present on the client device 109. For example, an evaluation component of the workflow micro application 138 can determine that the management SDK 157 is present by analyzing the data store 153, checking a setting of the client device 109, or attempting to perform a command using the management SDK 157. If the evaluation component verifies that the management SDK 157 is present, the process can move to step 309. However, if the management SDK 157 is absent or unverified, the process can move to step 312.

In step 309, the workflow micro application 138 can enable a workflow actions component of the workflow micro application 138. The actions component can render a workflow actions area in the workflow micro application 138 that includes account-specific action elements. The action elements can be user interface elements for account-specific actions 136 relevant to the workflow content of the email message 181. To this end, the workflow micro application 138 can identify account-specific actions 136 to include based on an enterprise account 123 associated with the client device 109. The workflow micro application 138 can utilize the management SDK 157 to authenticate communications between the client device 109 and the workflow service 120. The workflow micro application 138 can, using the management SDK 157, transmit a request for permitted or account-specific actions to the workflow service 120. The management SDK 157 can include addresses for endpoints of the workflow service 120, including a permitted actions endpoint. The management SDK 157 can also have access to an SSO token 133 that has been retrieved for the client device 109. The request for account-specific actions can include the SSO token 133. The workflow service 120 can return the account-specific actions to the workflow micro application 138.

A reader user interface of an email application 156 can render a user interface of the workflow micro application 138 for display in the email message 181. The user interface of the workflow micro application 138 can include a workflow information area and a workflow actions area. The workflow actions area of the workflow micro application 138 can be shown because the workflow actions component is enabled. The workflow information area can include workflow-relevant network service data 179 that is associated with the workflow content of the email message 181. The workflow actions area can include action elements for each account-specific action 136 identified for the client device 109.

In step 312, the workflow micro application 138 can disable an actions component of the workflow micro application 138. Disabling the actions component can hide or decline to render a workflow action elements area of the workflow micro application 138. Disabling the actions component does not affect the workflow information area. The user interface of the workflow micro application 138 can include a workflow information area. The workflow actions area of the workflow micro application 138 can be hidden because the workflow actions component is disabled. The workflow information area can include workflow-relevant network service data 179 that is associated with the workflow content of the email message 181.

In step 315, the workflow micro application 138 can identify whether an action element rendered for display in the email message 181 is user-selected. If the workflow micro application 138 identifies a user selection of an action element, the process can proceed to step 318.

In step 318, the workflow micro application 138 can transmit a request for the action to be performed on the network service 106. The workflow micro application 138 can transmit the action request to the workflow service 120 along with an SSO token 133. The workflow micro application 138 can utilize the management SDK 157 to transmit the action request. For example, the management SDK 157 can include an appropriate workflow service endpoint, such as an actions implementation endpoint, or a connector endpoint for the workflow service 120. Accordingly, the micro application 138 can use the connector 139 of the workflow service 120 to request that the action 136 be taken at the network service 106. The workflow service 120 can perform authentication with the network service 106 using service authentication data 140 to facilitate the request for the action to be performed using the network service 106.

This process can enable authentication processes that can be difficult or impossible on certain client devices 109.

Figure 4:
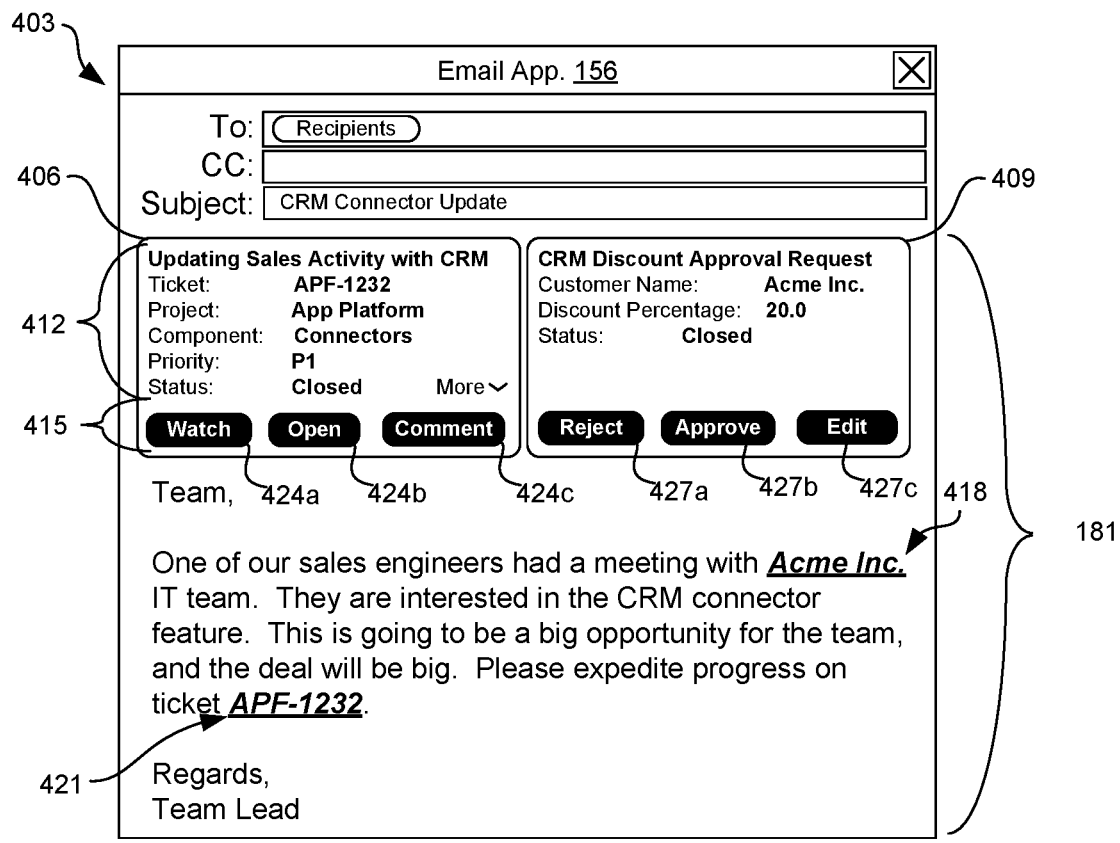
FIG. 4 is a drawing illustrating functionalities implemented by the workflow service and presented using a display of a client device.

FIG. 4 shows an example of a user interface 403 generated by an email application 156 in conjunction with workflow micro applications 138, and rendered for display on a client device 109. The user interface 403 can include an email message 181 being composed in an email composition user interface of the email application 156. The email message 181 can include micro application user interfaces 406 and 409. The email message 181 can also include workflow content 418 and 421. The text of the workflow content can be highlighted, bolded, underlined, italicized or otherwise visually emphasized.

The micro application user interface 406 can include a workflow information area or section 412 and a workflow actions area or section 415. The workflow information area 412 can include a title of a micro application 138 corresponding to the user interface 406. The workflow information area 412 can also include network service data 179 such as the ticket number, project name or identifier, component information, priority information, and status information associated with the workflow content 421. The workflow actions area 415 can include action elements 424a . . . 424c, each of which can be associated with an account-specific workflow action 136 that is permitted for an enterprise account 123 associated with the client device 109. The action elements 424a . . . 424c can also be associated with the workflow content 421. The presence of the workflow actions area 415 can indicate that a management SDK 157 is present on the client device 109.

The micro application user interface 409 can also include a workflow information area and a workflow actions area. The workflow information area can include a title of a micro application 138 corresponding to the user interface 409, as well as network service data 179 such as a customer name, a discount percentage, and status information associated with the workflow content 418. The workflow actions area can include action elements 427a . . . 427c, each of which can be associated with an account-specific workflow action 136 that is permitted for an account associated with the client device 109. The action elements 427a . . . 427c can also be associated with the workflow content 418.

Figure 5:
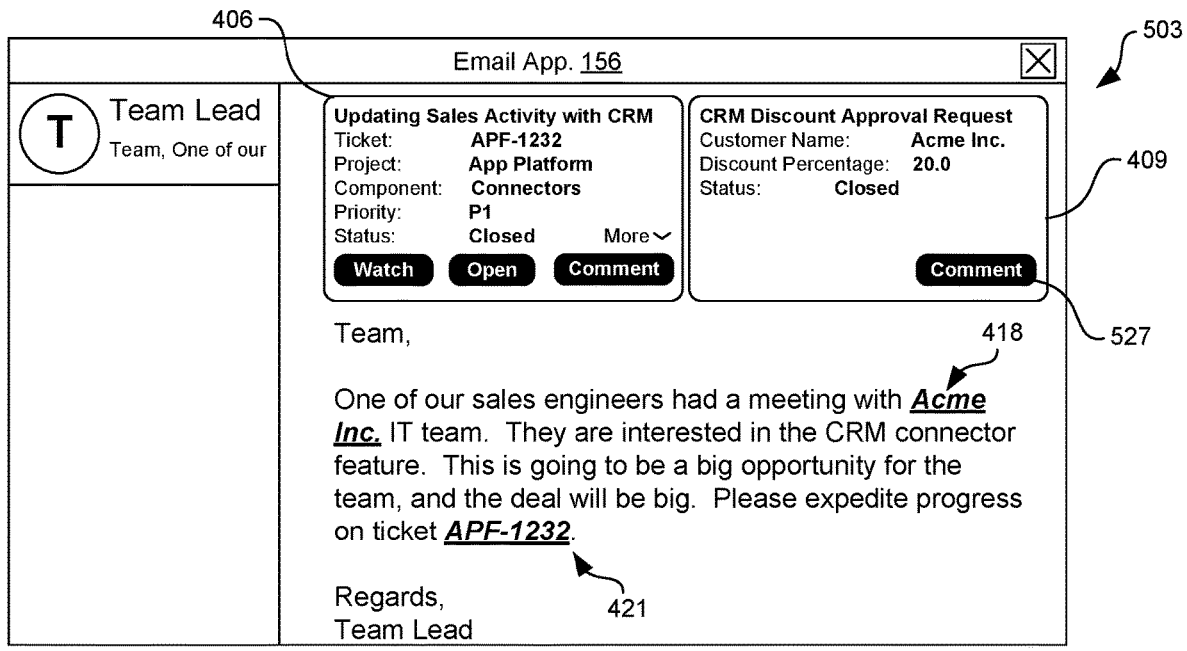
FIG. 5 is a drawing illustrating functionalities implemented by the workflow service and presented using a display of a client device.

FIG. 5 shows an example of a user interface 503 generated by an email application 156 in conjunction with workflow micro applications 138, and rendered for display on a client device 109. The user interface 503 can include an email message 181 being read in an email reader user interface of the email application 156. The email message 181 can be a same email message 181 as is composed in FIG. 4. The email message 181 can also include micro application user interfaces 406 and 409 of the same workflow micro applications 138. The email message 181 can also include the workflow content 418 and 421.

The recipient of the email message 181 can read the email message 181 on a different client device 109, which can be associated with a different enterprise account 123. As a result, while the user interface 406 is unchanged from FIG. 4, the workload actions area of the user interface 409 now includes the action element 527, and excludes the action elements 427a . . . 427c. This indicates that the enterprise account 123 of the recipient does not have the permissions for to "reject," approve," or "edit," the "CRM Discount Approval Request," (compare FIG. 4) but does have permissions for a "comment" action 136 as indicated by inclusion of action element 527. The presence of the workflow actions area can indicate that management SDK 157 is present on the recipient's client device 109.

Figure 6:
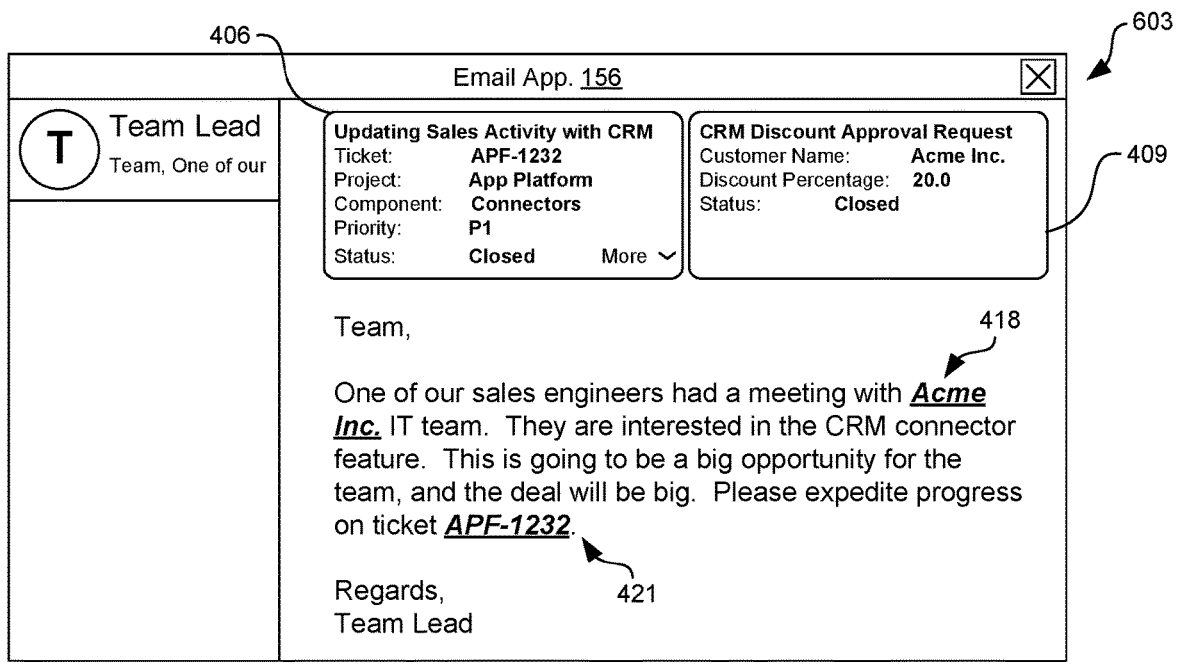
FIG. 6 is a drawing illustrating functionalities implemented by the workflow service and presented using a display of a client device.

FIG. 6 shows an example of a user interface 603 generated by an email application 156 in conjunction with workflow micro applications 138, and rendered for display on a client device 109. The user interface 603 can include an email message 181 being read in an email reader user interface of the email application 156. The email message 181 can be a same email message 181 as is composed in FIG. 4. The email message 181 can also include micro application user interfaces 406 and 409 of the same workflow micro applications 138. The email message 181 can also include the workflow content 418 and 421.

The recipient of the email message 181 can read the email message 181 on a different client device 109, which can be associated with a different enterprise account 123. As a result, while the user interfaces 406 and 409 of the micro applications 138 are included, they can be changed based on the enterprise account 123 associated with the recipient's client device 109. In this situation, while the workflow information areas of the user interfaces 406 and 409 are shown, the micro applications 138 have hidden the workflow action areas. For example, the respective workflow micro applications 138 determined that management SDK 157 is absent from the recipient's client device 109, and have disabled their workflow actions components.

Figure 7A:
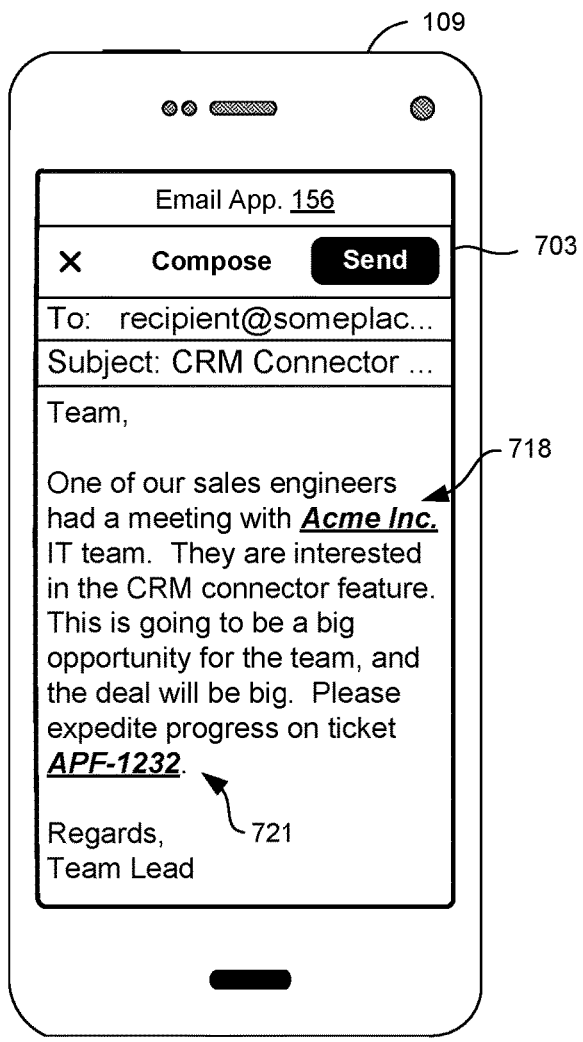
FIG. 7A is a drawing illustrating functionalities implemented by the workflow service and presented using a display of a client device.

FIG. 7A shows an example of a user interface 703 generated by an email application 156 in conjunction with workflow micro applications 138, and rendered for display on a client device 109. In this case, the client device 109 can be a mobile device or another device that has limited screen area. The workflow micro applications 138 can determine that the mobile device has limited screen area based on screen resolution, screen size, device type, or other screen information data associated with the client device 109.

As a result of the limited screen area, while the management agent 159 can identify workflow content 718 and 721, and can embed corresponding micro applications 138 in the email message 181, the user interfaces of the micro applications 138 are not shown. However, the text of the workflow content 718 and 721 is highlighted, bolded, underlined, italicized or otherwise visually emphasized. This can indicate that the workflow content 718 and 721 can be user-selected by a mouseover, a finger touch or other touch gesture, or another user selection of the workflow content 718 user interface element.

Figure 7B:
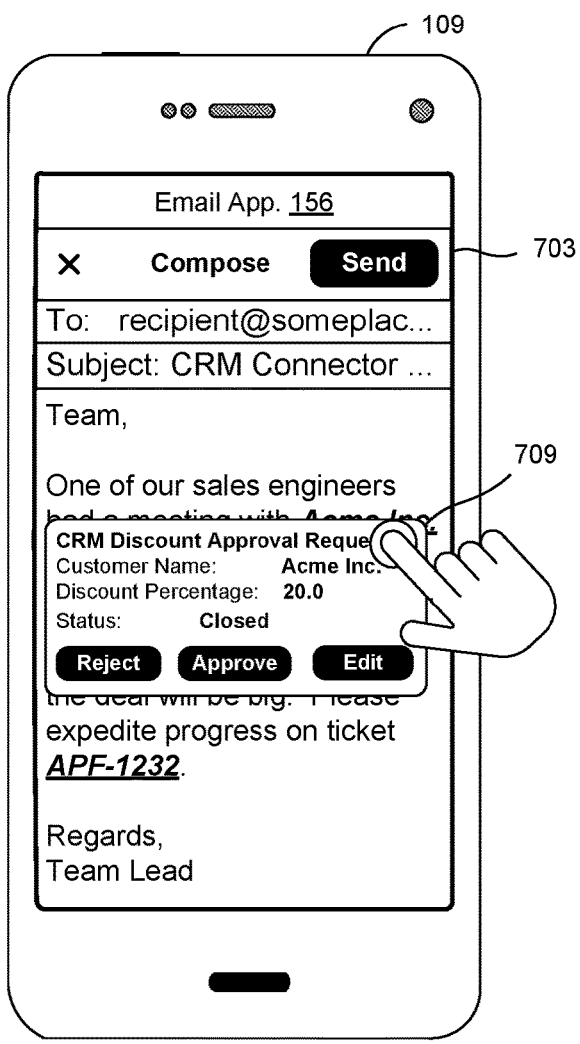
FIG. 7B is a drawing illustrating functionalities implemented by the workflow service and presented using a display of a client device.

FIG. 7B shows an example of the user interface 703 of FIG. 7A. However, the workflow content 718 is user selected, for example, by touch gesture on the display of the client device 109. In response to the touch gesture, the micro application user interface 709 is rendered for display. The micro application user interface 709 can include a workflow information area that includes a title of a micro application 138 corresponding to the micro application user interface 709, as well as network service data 179 such as a customer name, a discount percentage, and status information associated with the workflow content 718. The workflow actions area can include action elements associated with a respective account-specific workflow actions 136 that are permitted for an enterprise account 123 associated with the client device 109.

Figure 8:
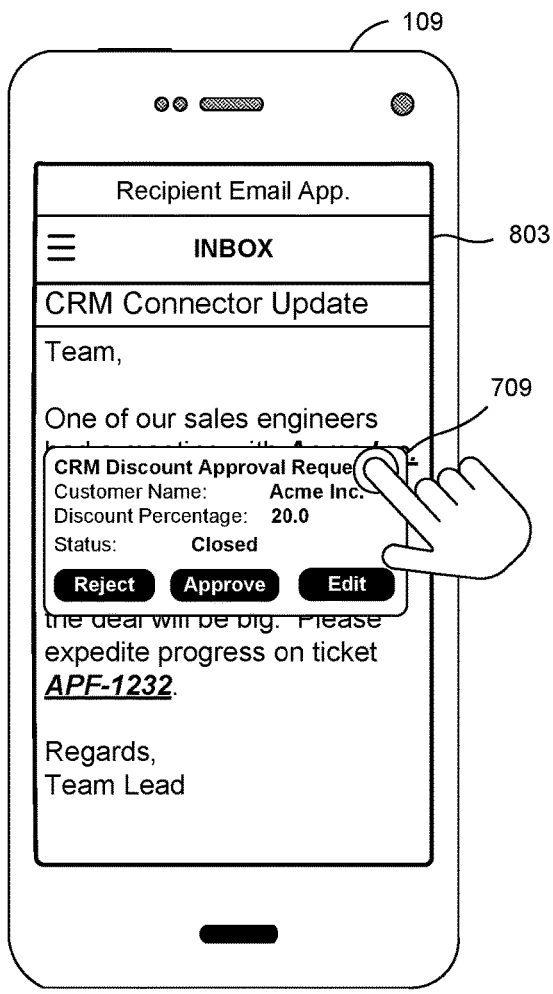
FIG. 8 is a drawing illustrating functionalities implemented by the workflow service and presented using a display of a client device.

FIG. 8 shows an example of the user interface 803 generated by an email application 156 in conjunction with workflow micro applications 138, and rendered for display on a client device 109. The client device 109 can be a mobile device or another device that has limited screen area. This can refer to the same email message 181 as is composed in FIGS. 7A and 7B and can include the same workflow micro applications 138. The user interface 803 can be rendered on a recipient's client device 109 that is different from the composer's device. In this case, the recipient's client device 109 can be authorized or permitted for the same actions as the composer. As a result, in response to a touch gesture, the micro application user interface 709 is rendered for display with the same workflow information area and the same workflow actions area shown in FIG. 7B.

Figure 9:
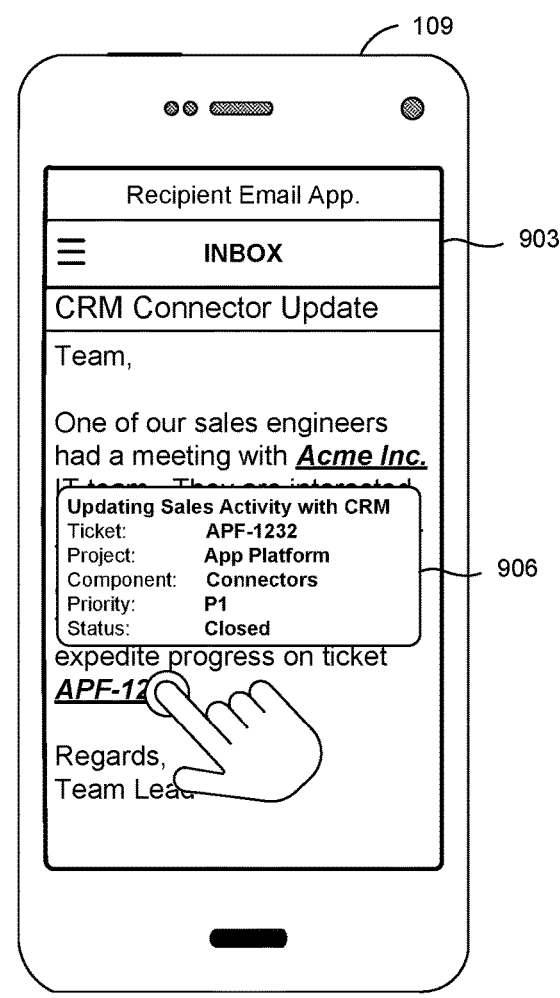
FIG. 9 is a drawing illustrating functionalities implemented by the workflow service and presented using a display of a client device.

FIG. 9 shows an example of a user interface 903 generated by an email application 156 in conjunction with workflow micro applications 138, and rendered for display on a client device 109. The client device 109 can be a mobile device or another device that has limited screen area. This can refer to the same email message 181 as is composed in FIGS. 7A and 7B, and can include the same workflow micro applications 138. The user interface 903 can be rendered on a recipient's client device 109 that is different from the composer's device. Here, the recipient's client device 109 does not include the management SDK 157. In response to a touch gesture that selects the workflow data 721 (see FIG. 7A), a micro application user interface 906 is rendered for display, providing a workflow information area that includes network service data 179, while a workflow actions area remains hidden or unrendered.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface generated by workflow service 120, email application 156, management agent 159, micro applications 138, or another application can be rendered. In some examples, the user interface can be generated with user interface data provided by the computing environment 103. The client devices 109 can also include one or more input/output devices that can include, for example, a capacitive touchscreen or other type of touch input device, fingerprint reader, or keyboard.

Although the workflow service 120 email application 156, management agent 159, micro applications 138, and other various services and functions described can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The flowcharts show an example of the functionality and operation of an implementation of portions of components described. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described for use by or in connection with the instruction execution system. The computer-readable medium can include any one of many physical media, such as magnetic, optical, or semiconductor media. Examples of a suitable computer-readable medium include solid-state drives or flash memory. Further, any logic or application described can be implemented and structured in a variety of ways. For example, one or more applications can be implemented as modules or components of a single application. Further, one or more applications described can be executed in shared or separate computing devices or a combination thereof. For example, a plurality of the applications described can execute in the same computing device, or in multiple computing devices.

It is emphasized that the above-described embodiments of the present disclosure are merely possible examples of Therefore, the following is claimed:

1. A system, comprising:

at least one computing device comprising at least one processor and at least one memory; and machine-readable instructions stored in the at least one memory, wherein the instructions, when executed by the at least one processor, cause the at least one computing device to at least:

receive, by an email application executed by a client device, an email message comprising workflow content in text of the email message, and a workflow micro application, wherein the workflow micro application comprises a workflow information component, and evaluation component, and a workflow actions component;

evaluate, by the evaluation component, a presence or an absence of a management software development kit (SDK) on the client device, wherein the management SDK performs authentication with a workflow service and specifies an actions implementation endpoint of the workflow service;

retrieve, using a permitted actions endpoint of a workflow service comprising a plurality of actions for the workflow content, at least one account-specific workflow action to show within a workflow micro application user interface, wherein the at least one account-specific workflow action comprises a subset of the plurality of actions that is permitted to be performed by an enterprise account associated with the client device; and render, by the email application, the workflow micro application user interface within a user interface comprising the email message, wherein the workflow micro application user interface shows, within a workflow actions interface area, the at least one account-specific workflow action retrieved from the workflow service for display in the workflow micro application user interface.

2. The system of claim 1, wherein the at least one account-specific workflow action is retrieved by at least transmitting, to the permitted actions endpoint of the workflow service, a request for account-specific workflow actions, the request comprising a single sign on (SSO) token retrieved from the client device.

3. The system of claim 2, wherein the workflow micro application uses the management SDK to transmit the request for account-specific workflow actions to the permitted actions endpoint of the workflow service.

4. The system of claim 2, wherein the at least one account-specific workflow action is retrieved by further receiving, from the workflow service, the at least one account-specific workflow action based on the enterprise account associated with the SSO token, wherein the enterprise account comprises permissions to perform the at least one account-specific workflow action.

5. The system of claim 4, wherein the instructions, when executed by the at least one processor, further cause the at least one computing device to at least:

identify a user selection of an action element from the workflow actions interface area; and transmit a request to perform the at least one account-specific workflow action, wherein the workflow service performs authentication with a network service using service authentication data to facilitate the request to perform the at least one account-specific workflow action using a network service.

6. The system of claim 5, wherein the request to perform the at least one account-specific workflow action comprises the SSO token.

7. The system of claim 1, wherein the instructions, wherein the workflow micro application enables the workflow actions component to show the workflow actions interface area, or disables the workflow actions component to hide the workflow actions interface area.

8. A non-transitory computer-readable medium comprising machine-readable instructions for workflow service email integration, wherein the instructions, when executed by at least one processor, cause at least one computing device to at least:

receive, by an email application executed by a client device, an email message comprising workflow content in text of the email message, and a workflow micro application, wherein the workflow micro application comprises a workflow information component, and evaluation component, and a workflow actions component;

evaluate, by the evaluation component, a presence or an absence of a management software development kit (SDK) on the client device, wherein the management SDK performs authentication with a workflow service and specifies a network address of an actions implementation endpoint of the workflow service;

retrieve, using a permitted actions endpoint of a workflow service comprising a plurality of actions for the workflow content, at least one account-specific workflow action to show within a workflow micro application user interface, wherein the at least one account-specific workflow action comprises a subset of the plurality of actions that is permitted to be performed by an enterprise account associated with the client device; and render, by the email application, by the email application, the workflow micro application user interface within a user interface comprising the email message, wherein the workflow micro application user interface shows, within a workflow actions interface area, the at least one account-specific workflow action retrieved from the workflow service for display in the workflow micro application user interface.

9. The non-transitory computer-readable medium of claim 8, wherein the at least one account-specific workflow action is retrieved by at least transmitting, to the permitted actions endpoint of the workflow service, a request for account-specific workflow actions, the request comprising a single sign on (SSO) token retrieved from the client device.

10. The non-transitory computer-readable medium of claim 9, wherein the workflow micro application uses the management SDK to transmit the request for account-specific workflow actions to the permitted actions endpoint of the workflow service.

11. The non-transitory computer-readable medium of claim 9, wherein the at least one account-specific workflow action is retrieved by further receiving, from the workflow service, the at least one account-specific workflow action based on an enterprise account associated with the SSO token, wherein the enterprise account comprises permissions to perform the at least one account-specific workflow action.

12. The non-transitory computer-readable medium of claim 11, wherein the instructions, when executed by the at least one processor, further cause the at least one computing device to at least:
identify a user selection of an action element from the workflow actions interface area; and
transmit a request to perform the at least one account-specific workflow action, wherein the workflow service performs authentication with a network service using service authentication data to facilitate the request to perform the at least one account-specific workflow action using a network service.

13. The non-transitory computer-readable medium of claim 12, wherein the request to perform the at least one account-specific workflow action comprises the SSO token.

14. The non-transitory computer-readable medium of claim 8, wherein the instructions, wherein the workflow micro application enables the workflow actions component to show the workflow actions interface area, or disables the workflow actions component to hide the workflow actions interface area.

15. A method, comprising:
receiving, by an email application executed by a client device, an email message comprising workflow content in text of the email message, and a workflow micro application, wherein the workflow micro application comprises a workflow information component, and evaluation component, and a workflow actions component;
evaluating, by the evaluation component, a presence or an absence of a management software development kit (SDK) on the client device, wherein the management SDK performs authentication with a workflow service and specifies a network address of an actions implementation endpoint of the workflow service;
retrieving, using a permitted actions endpoint of a workflow service comprising a plurality of actions for the workflow content, at least one account-specific workflow action to show within a workflow micro application user interface, wherein the at least one account-specific workflow action comprises a subset of the plurality of actions that is permitted to be performed by an enterprise account associated with the client device; and
rendering, by the email application, by the email application, the workflow micro application user interface within a user interface comprising the email message, wherein the workflow micro application user interface shows, within a workflow actions interface area, the at least one account-specific workflow action retrieved from the workflow service for display in the workflow micro application user interface.

16. The method of claim 15, wherein the at least one account-specific workflow action is retrieved by at least transmitting, to the permitted actions endpoint of the workflow service, a request for account-specific workflow actions, the request comprising a single sign on (SSO) token retrieved from the client device.

17. The method of claim 16, wherein the workflow micro application uses the management SDK to transmit the request for account-specific workflow actions to the permitted actions endpoint of the workflow service.

18. The method of claim 16, wherein the at least one account-specific workflow action is retrieved by further receiving, from the workflow service, the at least one account-specific workflow action based on the enterprise account associated with the SSO token, wherein the enterprise account comprises permissions to perform the at least one account-specific workflow action.

19. The method of claim 18, further comprising:
identifying a user selection of an action element from the workflow actions interface area; and
transmitting a request to perform the at least one account-specific workflow action, wherein the workflow service performs authentication with a network service using service authentication data to facilitate the request to perform the at least one account-specific workflow action using a network service.

20. The method of claim 19, wherein the workflow micro application user interface is shown based at least in part on a user selection or manipulation in association with the workflow content in the text of the email message.

* * * * *